US010362566B2

(12) United States Patent
Zhang

(10) Patent No.: US 10,362,566 B2
(45) Date of Patent: Jul. 23, 2019

(54) PUCCH METHODS AND APPARATUSES OF ENHANCED CA IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 63 days.

(21) Appl. No.: 15/658,657

(22) Filed: Jul. 25, 2017

(65) Prior Publication Data

US 2017/0325219 A1 Nov. 9, 2017

Related U.S. Application Data

(63) Continuation-in-part of application No. PCT/CN2015/099254, filed on Dec. 28, 2015.

(30) Foreign Application Priority Data

Jan. 27, 2015 (CN) .......................... 2015 1 0040667

(51) Int. Cl.
*H04L 5/00* (2006.01)
*H04W 72/04* (2009.01)
(Continued)

(52) U.S. Cl.
CPC ...... *H04W 72/0413* (2013.01); *H04B 7/0626* (2013.01); *H04L 1/0026* (2013.01);
(Continued)

(58) Field of Classification Search
CPC ............ H04W 72/0413; H04W 72/12; H04W 72/1284; H04W 88/02; H04W 88/08;
(Continued)

(56) References Cited

U.S. PATENT DOCUMENTS

2014/0161060 A1 6/2014 Nam
2015/0200751 A1* 7/2015 Yin ...................... H04L 1/1887
370/280

(Continued)

FOREIGN PATENT DOCUMENTS

CN 102355733 A 2/2012
CN 103026677 A 4/2013
CN 103581891 A 2/2014

OTHER PUBLICATIONS

3GPP TS 36.213 V11.9.0 (Dec. 2014).*

*Primary Examiner* — William Nealon
(74) *Attorney, Agent, or Firm* — Maschoff Brennan

(57) ABSTRACT

The present disclosure discloses an enhanced CA PUCCH method and device. In a first step, a UE receives a first high layer signaling, wherein the first high layer signaling indicates a reserved SR resource on a first serving cell. In a second step, the UE receives determines a target serving cell for transmitting SR indication information on a first sub frame, wherein the target serving cell is one of K candidate serving cells. In a third step, the UE transmits the SR indication information on the first sub frame of the target serving cell. Wherein the first serving cell is one of K candidate serving cells, the reserved SR resource is PUCCH resource, K is a positive integer, and the SR indication information indicates a positive SR or a negative SR.

12 Claims, 4 Drawing Sheets

(51) Int. Cl.
  *H04B 7/06*    (2006.01)
  *H04L 1/18*    (2006.01)
  *H04W 72/12*   (2009.01)
  *H04L 1/00*    (2006.01)
  *H04W 88/02*   (2009.01)
  *H04W 88/08*   (2009.01)

(52) U.S. Cl.
  CPC .......... *H04L 1/1812* (2013.01); *H04L 1/1861* (2013.01); *H04L 5/001* (2013.01); *H04L 5/0053* (2013.01); *H04L 5/0082* (2013.01); *H04L 5/0094* (2013.01); *H04W 72/12* (2013.01); *H04W 72/1284* (2013.01); *H04B 7/0639* (2013.01); *H04W 88/02* (2013.01); *H04W 88/08* (2013.01)

(58) Field of Classification Search
  CPC ... H04L 1/1812; H04L 1/0026; H04L 1/1861; H04L 5/001; H04L 5/0082; H04L 5/0094; H04B 7/0639; H04B 7/0626
  USPC .......................................................... 370/329
  See application file for complete search history.

(56) References Cited

U.S. PATENT DOCUMENTS

| | | | | |
|---|---|---|---|---|
| 2015/0223230 A1* | 8/2015 | Liang | .................... | H04L 5/0055 370/329 |
| 2015/0282020 A1* | 10/2015 | Pajukoski | ............. | H04W 28/26 370/331 |
| 2015/0305016 A1* | 10/2015 | Dai | ....................... | H04L 5/0053 370/280 |

* cited by examiner

PUCCH METHODS AND APPARATUSES OF ENHANCED CA IN UE AND BASE STATION

This application is a continuation in part of International Application No. PCT/CN2015/099254, filed on Dec. 28, 2015, and claims benefit to Chinese Patent Application No. CN201510040667.9, filed on Jan. 27, 2015, all of which is hereby incorporated by reference for all purposes. The International Application was published in China on Aug. 4, 2016 as WO2016119552A1 under PCT Article 21 (2).

BACKGROUND

Technical Field

The present disclosure is related to a method and a device of an uplink power control for dual connection communication in mobile communication technical field, and more particular to a scheme for an uplink power control in a scenario of Carrier Aggregation (CA) enhancement in Long Term Evolution (LTE) system.

Related Art

In the traditional LTE system R (release) 10 developed by 3GPP (3rd Generation Partner Project), the CA is introduced as one of the key techniques. The main idea is that user equipment (UE) may work on a plurality of carriers at the same time, and the CA may improve peak value rate of a single UE. In LTE CA, the UE is configured with one Pcell (primary cell) and one or more Scells (secondary cell). For FDD (frequency duplex division) LTE, one serving cell includes at least one downlink carrier of {one downlink carrier, one uplink carrier}. For TDD (time duplex division) LTE, one serving cell includes one carrier. In LTE R10, the UE supporting the CA may maximally be configured with five serving cells, and the UE may only transmit the PUCCH information on the Pcell. In 3GPP R10, the CA supports a cross carrier scheduling, i.e. the base station transmits a downlink signaling on a first carrier to schedule a wireless signal transmission on the second carrier. The base station uses a CIF (carrier indicator field) in the DCI (downlink control information) to indicate a target carrier to be scheduled. The CIF is indicated by three bits located on the header of the DCI.

A new research topic (RP-142286) is adopted in the 66th plenary of 3GPP RAN (radio access network), i.e. CA enhancement greater than five carriers—the topic is abbreviated as eCA in the present disclosure. In eCA, a maximum number of the supported serving cells is raised to 32.

In the traditional CA, the user equipment may only transmit PUCCH (Physical Uplink Control Channel) on the Pcell. One key technique of eCA is that the UE may transmit PUCCH on multiple serving cells. In the traditional LTE, PUCCH may be used for transmitting three kinds of UCI (Uplink Control Information), namely SR (Scheduling Request), HARQ (Hybrid Automatic Repeat Request) ACK, and CSI (Channel Status Information). Wherein CSI includes one or more of {RI (Rank Indicator), PTI (Precoding Type Indicator), PMI (Precoding Matrix Indicator), CQI (Channel Quality Indicator)}.

In eCA, air interface resources required by HARQ_ACK and CSI may be significantly increased, and air interface resources required by SR does not increase with the number of aggregated serving cells. It is required to research feedback on PUCCH.

SUMMARY

An intuitive solution reuses existing LTE scheme, i.e. SR is fixedly transmitted on a primary serving cell, and the base station configures PUCCH resource for transmitting SR through a high layer signaling. However, the inventor researches and discovers that the above intuitive solution may result in the following problem.

When SR conflicts with CSI on the primary serving cell, even if the UE is configured with PUCCH on a secondary serving cell, the UE may only drop CSI transmission on the primary serving cell.

For the above problem, one possible improved solution is that the base station pre-reserves PUCCH for transmitting SR on multiple serving cells. However, the above improved solution may incur the waste of air interface resource (the air interface of multiple bits is pre-reserved for SR information of one bit). The inventor further researches and discovers that if the UE is configured with PUCCH of a target format on a given sub frame of the secondary serving cell, the UE transmits SR on the secondary serving cell, so as to avoid dropping the CSI transmission, wherein SR conflicts with CSI on the given sub frame, and the target format may simultaneously accommodate PUCCH format of HARQ-_CAK and SR.

According to the above analysis, the present disclosure discloses a method in a UE, which includes the following steps:

Step A: receiving a first high layer signaling, wherein the first high layer signaling indicates a reserved SR resource on a first serving cell;

Step B: determining a target serving cell for transmitting SR indication information on a first sub frame, wherein the target serving cell is one of K candidate serving cells;

Step C: transmitting the SR indication information on the first sub frame of the target serving cell.

Wherein the first serving cell is one of K candidate serving cells, the reserved SR resource is PUCCH resource, K is a positive integer, and the SR indication information indicates a positive SR or a negative SR.

In one embodiment, the first high layer signaling is RRC (Radio Resource Control). In one embodiment, the first serving cell is fixed as a primary serving cell, and the first high layer signaling merely indicates the reserved SR resource.

In one embodiment, the first serving cell and the reserved SR resource are configured by the first high layer signaling. The advantage of the embodiment is that the air interface resources on the primary serving cell are tight, the reserved SR resource may be configured to secondary serving cell.

In one embodiment, compared to the existing SchedulingRequestConfigIE (Information Element), the first high layer signaling adds one cell index IE, and the cell index IE indicates the first serving cell. In one embodiment, the reserved SR resource is $n_{PUCCH,SRI}^{(1,p)}$ in the section 10.1.5 of TS36.213. In one embodiment, the SR indication information is one of {SR bit, HARQ_ACK selected by channel}. The HARQ_ACK selected by channel indicates that if it is the positive SR (i.e. the UE requests an uplink transmission resource), the HARQ_ACK is transmitted on the reserved SR resource, and if it is the negative SR (i.e. the UE does not request the uplink transmission resource), the HARQ_ACK is transmitted on a pre-reserved HARQ_ACK resource.

The character of the above aspect is that: the reserved SR resource is configured on one serving cell, so as to avoid the waste of the air interface resources. At the same time, (according to whether the SR indication information conflicts with CSI) the UE may select appropriate serving cell for the SR indication information, so as to minimize the effect of the SR indication information on CSI.

In the above Step B, there are multiple possible candidate schemes for determining the target serving cell. In one embodiment, how to determine the target serving cell is UE implementation related (i.e. it does not need standardization). A base station side adopts a blind detection method to determine the target serving cell. The inventor researches and discovers one preferable principle that: if the SR indication information is transmitted on the first serving cell without resulting in dropping the CSI transmission on the first serving cell, the SR indication information is transmitted on the first serving cell. Otherwise, it needs to determine whether the SR indication information may be transmitted on a serving cell other than the first serving cell. According to the above preferable principle, following three aspects of the present disclosure disclose three specific implementation manners of step B. The following three aspects may not only operate independently, but also may operate by combination of any two, and the following three aspects may be further combined together.

Specifically, according to one aspect of the present disclosure, if the SR indication information is compatible with a scheduled CSI, the target serving cell is the first serving cell.

The SR indication information compatible with the scheduled CSI means that the SR indication information is transmitted on the first sub frame of the first serving cell without resulting in dropping the CSI transmission by the UE on the first sub frame of the first serving cell. In one embodiment, the SR indication information compatible with the scheduled CSI means that the UE is not scheduled to transmit CSI on the first sub frame of the first serving cell. In one embodiment, the SR indication information compatible with the scheduled CSI means that the UE is scheduled to transmit A (Aperiodic)-CSI on the first sub frame of the first serving cell, and the UE is configured to simultaneously transmit PUSCH and PUCCH. In one embodiment, the SR indication information compatible with the scheduled CSI means that the UE is scheduled to transmit P (Periodic)-CSI or A-CSI on the first sub frame of the first serving cell, and the SR indication information is a negative SR. In one embodiment, the SR indication information compatible with the scheduled CSI means that CSI transmitted by the scheduled UE on the first sub frame of the first serving cell conflicts with HARQ_ACK transmitted by the UE on the first sub frame of the first serving cell, and thus the former is dropped to transmit.

Specifically, according to one aspect of the present disclosure, if the SR indication information conflicts with the scheduled CSI and if the UE does not transmit PUCCH of a target format on a serving cell other than the first serving cell, the step C further includes the following step:

Step C1: dropping a CSI transmission on the first sub frame of the first serving cell.

Wherein the target serving cell is the first serving cell, K is 1, the target format simultaneously transmits SR bit and PUCCH format of HARQ_ACK, the SR indication information indicates the positive SR.

In one embodiment, PUCCH of the target format not transmitted means that PUCCH of the target format is not configured.

In one embodiment, PUCCH of the target format not transmitted means that PUCCH of the target format is not configured, but the transmission is PUCCH format 1a or 1b.

In the present disclosure, the target format is one of the following:

PUCCH format 3;

new PUCCH format, wherein the new PUCCH format supports up to X NARQ_ACK bits and one SR bit, and X is a positive integer greater than 20. In one embodiment of X, X is 128.

In one embodiment, the SR indication information conflicting with the scheduled CSI means that the UE is scheduled to transmit P-CSI on the first sub frame of the first serving cell. In one embodiment, the SR indication information conflicting with the scheduled CSI means that the UE is scheduled to transmit A-CSI of non-associated transmission block on the first frame of the first serving cell, and the UE does not be configured as PUSCH and PUCCH transmission at the same time.

Specifically, according to an aspect of the present disclosure, if the SR indication information conflicts with the scheduled CSI, the step C further includes the following step:

Step C2: transmitting CSI on PUCCH of the first sub frame of the first serving cell;

Step C3: transmitting HARQ_ACK on PUCCH of the first sub frame of the target serving cell.

Wherein the target serving cell is a serving cell other than the first serving cell; the SR indication information and the HARQ_ACK are jointly transmitted on PUCCH of one target format, the SR indication information indicates the positive SR; the target format simultaneously transmits SR bit and PUCCH format of HARQ_ACK.

In one embodiment, the HARQ_ACK merely indicates whether PDSCH (Physical Downlink Shared Channel) transmission on the primary serving cell of the UE is accurately received, or merely indicates PDCCH (Physical Downlink Control Channel)/EPDCCH (Enhanced PDCCH) released by downlink SPS (Semi Persistent Scheduling) of the primary serving cell.

In traditional LTE, the HARQ_ACK corresponding to the scenario described by the above embodiment adopts PUCCH format 1a or 1b (even if PUCCH format 3 is configured). Due to the transmission of the SR bit, the above embodiment does not reuse the traditional LTE scheme, i.e. does not fall back to PUCCH format 1a or 1b, so as to avoid dropping CSI transmission on the first serving cell.

In one embodiment, the HARQ_ACK indicates whether PDSCH on at least a serving cell other than the primary serving cell of the UE is accurately received. The character of the embodiment is that PUCCH of the target format in a particular scenario (described by the above embodiment) falls back to PUCCH format 1a or 1b, and the fallback PUCCH format does not support the SR bit. Therefore, only when a transmission scenario of the target serving cell is outside of the particular scenario, the SR indication information and the HARQ_ACK may be jointly transmitted on PUCCH of one target format.

In the above aspect, when there is a plurality of serving cells with conformed condition other than the first serving cell in K candidate serving cell, the target serving cell is one of the plurality of serving cells with conformed condition. The following two embodiments are the specific implementations selected by two serving cells.

In one embodiment, the target serving cell is a serving cell with minimum serving cell index in the serving cells with conformed condition, and the serving cell with conformed condition is a serving cell carrying PUCCH of the target format transmitted by the UE on the first sub frame. The serving cell index is non-negative integer configured by the high layer signaling.

In one embodiment, the target serving cell is a serving cell with maximum redundancy in the serving cell with conformed condition, if there is a plurality of serving cell with the same maximum redundancy, the target serving cell is the serving cell with minimum serving cell index therein. The redundancy is a value obtained by dividing non-mapped HARQ_ACK bit of PUCCH of the target format transmitted by the UE on the first sub frame by number of maximum supported HARQ_ACK bits.

In one embodiment, the associative transmission of the SR indication information and the HARQ_ACK means that the SR indication information is indicated by the SR bit and the SR bit and the HARQ_ACK are transmitted on the same PUCCH. In a first exemplary embodiment of the embodiment, a format of the same PUCCH is PUCCH format 3. In a second exemplary embodiment of the embodiment, a format of the same PUCCH is the above new PUCCH format (it supports up to X HARQ_ACK bits and one SR bit, and X is a positive integer greater than 20).

Specifically, according to one aspect of the present disclosure, the UE is configured with PUCCH of target format on other serving cells except for the first serving cell in K candidate serving cells. The target format may simultaneously transmit SR bit and PUCCH format of HARQ_ACK.

In one embodiment, the UE is configured with one of PUCCH formats {1a, 1b, 2, 2a, 2b} on the first serving cell.

In one embodiment, the UE is configured with PUCCH of the target format on a given serving cell, but the UE does not transmit PUCCH of the target format on a given sub frame of the given serving cell (it may fall back to PUCCH format 1a/1b, or drop the transmission).

In one embodiment, in a current active serving cell configured by the UE, all of the serving cells configured with PUCCH of the target format are K candidate serving cells.

In one embodiment, the target format is PUCCH format 3. In one embodiment, the target format is the above new PUCCH format. In one embodiment, a part of serving cells in K candidate serving cells are configured with PUCCH format 3, and the other serving cells are configured with the new PUCCH format.

The inventive contents of the present disclosure are described separately for the UE and the base station. In should be noted that the operations of the UE and the base station side correspond with each other. Therefore, in the absence of conflict, the above embodiments, exemplary embodiments and features thereof for the UE in the inventive content of the application may be applied to the base station.

The present disclosure discloses a method in a base station, which includes the following steps:

Step A: transmitting a first high layer signaling, wherein the first high layer signaling indicates a reserved SR resource of a target UE on a first serving cell;

Step B: determining a target serving cell of the target UE for transmitting SR indication information on a first sub frame, wherein the target serving cell is one of K candidate serving cells;

Step C: receiving the SR indication information transmitted by the target UE on the first sub frame of the target serving cell.

Wherein the first serving cell is one of K candidate serving cells, the reserved SR resource is PUCCH resource, K is a positive integer, and the SR indication information indicates a positive SR or a negative SR.

Specifically, according to one aspect of the present disclosure, if the SR indication information is compatible with a scheduled CSI, the target serving cell is the first serving cell.

Specifically, according to one aspect of the present disclosure, if the SR indication information conflicts with the scheduled CSI and if the target UE does not transmit PUCCH of a target format on a serving cell other than the first serving cell, the step C further includes the following step:

Step C1: assuming that the target UE drops a CSI transmission on the first sub frame of the first serving cell.

Wherein the target serving cell is the first serving cell, K is 1, the target format simultaneously transmits SR bit and PUCCH format of HARQ_ACK, the SR indication information indicates the positive SR.

Specifically, according to an aspect of the present disclosure, if the SR indication information conflicts with the scheduled CSI, the step C further includes the following step:

Step C2: receiving CSI transmitted by the target UE on PUCCH of the first sub frame of the first serving cell;

Step C3: receiving HARQ_ACK transmitted by the target UE on PUCCH of the first sub frame of the target serving cell.

Wherein the target serving cell is a serving cell other than the first serving cell. The SR indication information and the HARQ_ACK are jointly transmitted on PUCCH of one target format, the SR indication information indicates the positive SR. The target format may simultaneously transmit SR bit and PUCCH format of HARQ_ACK.

Specifically, according to an aspect of the present disclosure, the UE is configured with PUCCH of target format on other serving cells except for the first serving cell in K candidate serving cells. The target format may simultaneously transmit SR bit and PUCCH format of HARQ_ACK.

The present disclosure discloses a user equipment, and the UE includes:

a first module, for receiving a first high layer signaling, wherein the first high layer signaling indicates a reserved SR resource on a first serving cell;

a second module, for determining a target serving cell for transmitting SR indication information on a first sub frame, wherein the target serving cell is one of K candidate serving cells and how to determine the target serving cell is UE implementation related;

a third module, for transmitting the SR indication information on the first sub frame of the target serving cell.

Wherein the first serving cell is one of K candidate serving cells, the reserved SR resource is PUCCH resource, K is a positive integer, and the SR indication information indicates a positive SR or a negative SR.

In one embodiment, the features of the above equipment are that: if the SR indication information is compatible with a scheduled CSI, the target serving cell is the first serving cell.

In one embodiment, the features of the above equipment are that: if the SR indication information conflicts with the scheduled CSI and if the UE does not transmit PUCCH of a target format on a serving cell other than the first serving cell, and the third module is further used for dropping a CSI transmission on the first sub frame of the first serving cell. Wherein the target serving cell is the first serving cell, K is 1, the target format may simultaneously transmit SR bit and PUCCH format of HARQ_ACK, the SR indication information indicates the positive SR.

In one embodiment, the features of the above equipment are that: if the SR indication information conflicts with the scheduled CSI, the third module is further used for:

transmitting CSI on PUCCH of the first sub frame of the first serving cell;

transmitting HARQ_ACK on PUCCH of the first sub frame of the target serving cell.

Wherein the target serving cell is a serving cell other than the first serving cell; the SR indication information and the HARQ_ACK are jointly transmitted on PUCCH of one target format, the SR indication information indicates the positive SR; the target format simultaneously transmits SR bit and PUCCH format of HARQ_ACK.

In one embodiment, the features of the above equipment are that: the UE is configured with PUCCH of target format on other serving cells except for the first serving cell in K candidate serving cells. The target format may simultaneously transmit SR bit and PUCCH format of HARQ_ACK.

The above three features may be the combination of any two, or the combination of the three together.

The present disclosure discloses a base station equipment, and the base station equipment includes:

a first module, transmitting a first high layer signaling, wherein the first high layer signaling indicates a reserved SR resource of a target UE on a first serving cell;

a second module, for determining a target serving cell of the target UE for transmitting SR indication information on a first sub frame, wherein the target serving cell is one of K candidate serving cells;

a third module, for receiving the SR indication information transmitted by the target UE on the first sub frame of the target serving cell.

Wherein the first serving cell is one of K candidate serving cells, the reserved SR resource is PUCCH resource, K is a positive integer, and the SR indication information indicates a positive SR or a negative SR.

In one embodiment, the features of the above equipment are that: if the SR indication information is compatible with a scheduled CSI, the target serving cell is the first serving cell.

In one embodiment, the features of the above equipment are that: if the SR indication information conflicts with the scheduled CSI and if the target UE does not transmit PUCCH of a target format on a serving cell other than the first serving cell, the third module is further used for assuming that the target UE drops a CSI transmission on the first sub frame of the first serving cell. Wherein the target serving cell is the first serving cell, K is 1, the target format may simultaneously transmit SR bit and PUCCH format of HARQ_ACK, the SR indication information indicates the positive SR.

In one embodiment, the features of the above equipment are that: if the SR indication information conflicts with the scheduled CSI, the third module is further used for:

receiving CSI transmitted by the target UE on PUCCH of the first sub frame of the first serving cell;

receiving HARQ_ACK transmitted by the target UE on PUCCH of the first sub frame of the target serving cell.

Wherein the target serving cell is a serving cell other than the first serving cell. The SR indication information and the HARQ_ACK are jointly transmitted on PUCCH of one target format, the SR indication information indicates the positive SR. The target format may simultaneously transmit SR bit and PUCCH format of HARQ_ACK.

The above three features may be the combination of any two, or the combination of the three together.

In one embodiment, the features of the above equipment are that: the UE is configured with PUCCH of target format on other serving cells except for the first serving cell in K candidate serving cells. The target format may simultaneously transmit SR bit and PUCCH format of HARQ_ACK.

In eCA scenario, how to transmit SR is only that the information does not have a disclosed solution. According to the existing LTE standard, one intuitive solution is that SR is fixedly transmitted on the primary serving cell, and the base station configures PUCCH resource for transmitting SR through the high layer signaling.

Compared to the above intuitive solution, the scheme of the present disclosure has the following advantages.

The base station selects the serving cell with lower load for the reserved SR resource, it is advantageous for the load balancing on the serving cell.

CSI dropping caused by transmitting SR indication information is reduced as much as possible, thereby avoiding a decrease of the transmission performance caused by the CSI dropping.

There is no overhead to add additional air interface resource (SR bit and HARQ_ACK are transmitted on PUCCH of the target format, and the reserved SR resource is configured on only one serving cell).

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
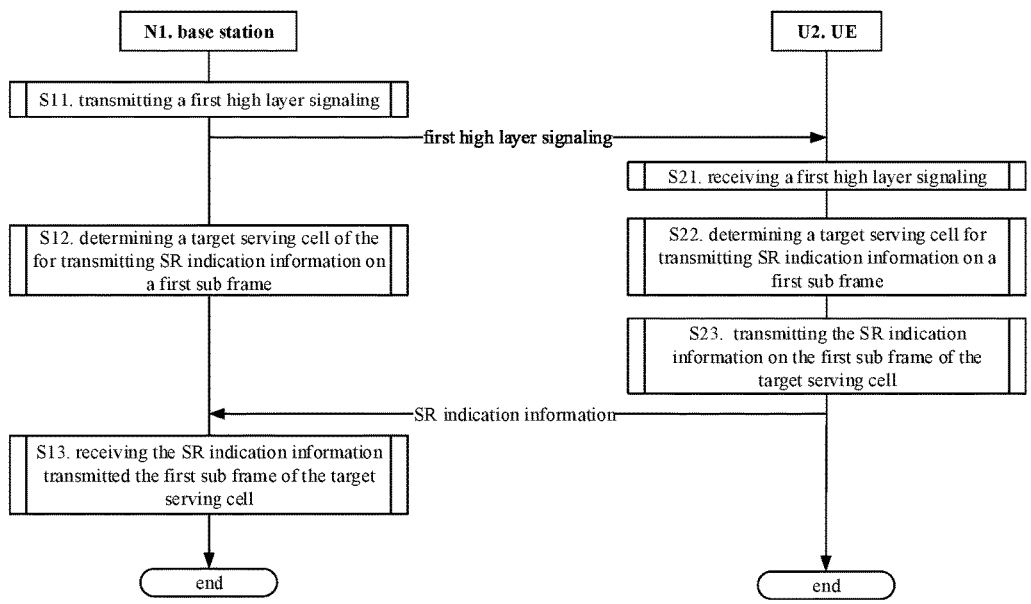
FIG. 1 is a flowchart of transmitting SR indication information according to one embodiment of the present disclosure.

Embodiment I illustrates a flowchart of transmitting SR indication, as shown in FIG. 1. In FIG. 1, a base station N1 is a maintaining base station of a serving cell of a UE U2.

For the base station N1, in step S11, the method involves transmitting a first high layer signaling, wherein the first high layer signaling indicates a reserved SR resource of the UE U2 on a first serving cell. In step S12, the method involves determining a target serving cell of the UE U2 for transmitting SR indication information on a first sub frame, wherein the target serving cell is one of K candidate serving cells. In step S13, the method involves receiving the SR indication information transmitted by the UE U2 on the first sub frame of the target serving cell.

For the UE U2, in step S21, the method involves receiving a first high layer signaling. In step S22, the method involves determining a target serving cell for transmitting SR indication information on a first sub frame. In step S23, the method involves transmitting the SR indication information on the first sub frame of the target serving cell.

In Embodiment I, the first serving cell is one of K candidate serving cells, the reserved SR resource is PUCCH resource, K is a positive integer, and the SR indication information indicates a positive SR or a negative SR. The first high layer signaling is RRC signaling.

In a first exemplary embodiment of Embodiment I, the first high layer signal is SchedulingRequestConfigIE, and the first serving cell is fixed as a primary serving cell. The reserved SR resource is configured by sr-PUCCH-ResourceIndex in the first high layer signaling or by {sr-PUCCH-ResourceIndex, sr-PUCCH-ResourceIndexP1 (if it exists)} in the first high layer signaling.

In a second exemplary embodiment of Embodiment I, the first high layer signaling indicates the first serving cell, and the first high layer signaling is an improved SchedulingRequestConfigIE, i.e. one cell index IE is added based on SchedulingRequestConfigIE, and a value of the cell index IE is equal to a cell index value of the first serving cell.

In a third exemplary embodiment of Embodiment I, if the SR indication information is compatible with a scheduled CSI, the target serving cell is the first serving cell.

In a fourth exemplary embodiment of Embodiment I, if the SR indication information conflicts with the scheduled CSI and if the UE U2 is not configured with PUCCH of a target format on a serving cell other than the first serving cell, the target serving cell is the first serving cell, and the scheduled CSI is dropped. The target format may simultaneously transmit SR bit and PUCCH format of HARQ_ACK.

In a fifth exemplary embodiment of Embodiment I, the UE U2 transmits PUCCH of target format on other serving cells except for the first serving cell in K candidate serving cells. The target format may simultaneously transmit SR bit and PUCCH format of HARQ_ACK.

Embodiment II

Figure 2:
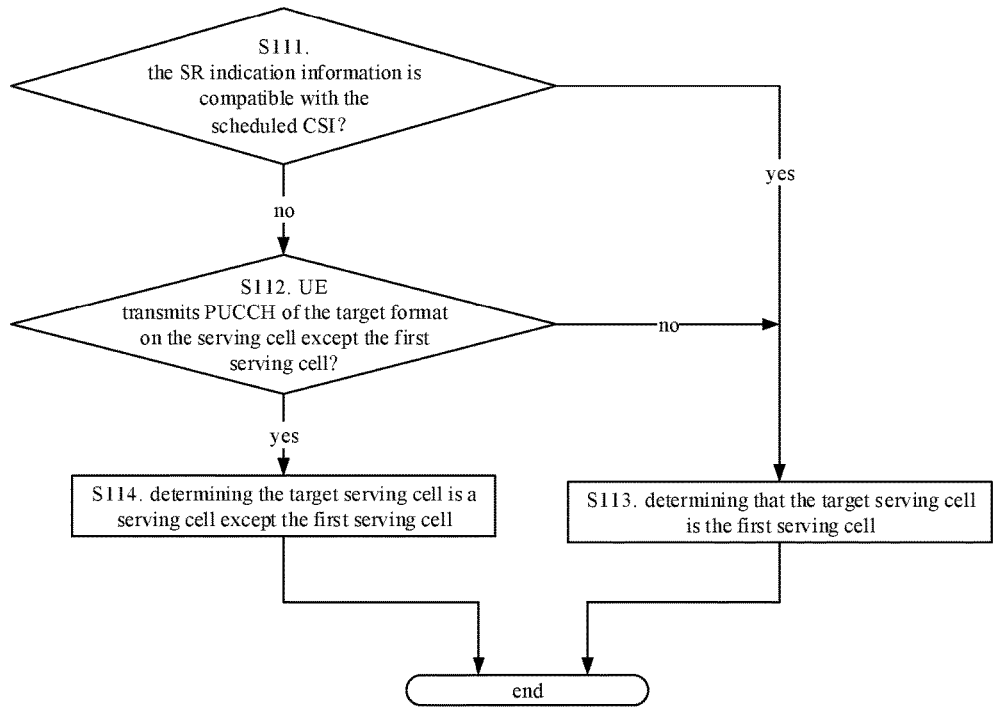
FIG. 2 is a flowchart of determining a target serving cell according to one embodiment of the present disclosure.

Embodiment II illustrates a flowchart of determining a target serving cell, as shown in FIG. 2. Embodiment II may be executed in the UE and a base station—separately correspond to the step S22 and the step S12 in Embodiment.

In step S111, the method involves determining whether the SR indication information is compatible with the scheduled CSI, i.e. determining whether the transmission of the SR indication information on the first sub frame of the first serving cell does not cause that the transmission UE of the SR indication information drops CSI transmission on the first sub frame of the first serving cell. If yes, in step S113, the method involves determining that the target serving cell for transmitting the SR indication information in the first sub frame is the first serving cell; if no, in step S112, the method involves determining whether the UE transmits PUCCH of the target format on the serving cell other than the first serving cell. If the determination result in the step S112 is no, in the step S113, the method involves determining the target serving cell as the first serving cell; if the determination result in the step S112 is yes, in step S114, the method involves determining the target serving cell is a serving cell other than the first serving cell.

In Embodiment II, the first serving cell is a serving cell stayed by the reserved SR resource configured for the SR indication information. The target format may simultaneously transmit SR bit and PUCCH format of HARQ_ACK, and the SR indication information indicates the positive SR.

In a first exemplary embodiment of Embodiment II, in the step S112, the UE transmits PUCCH of the target format on the multiple serving cells other than the first serving cell, and in the step S114, the method involves determining that the target serving cell is a serving cell corresponding to minimum serving cell index in the multiple serving cells.

Embodiment III

Figure 3:
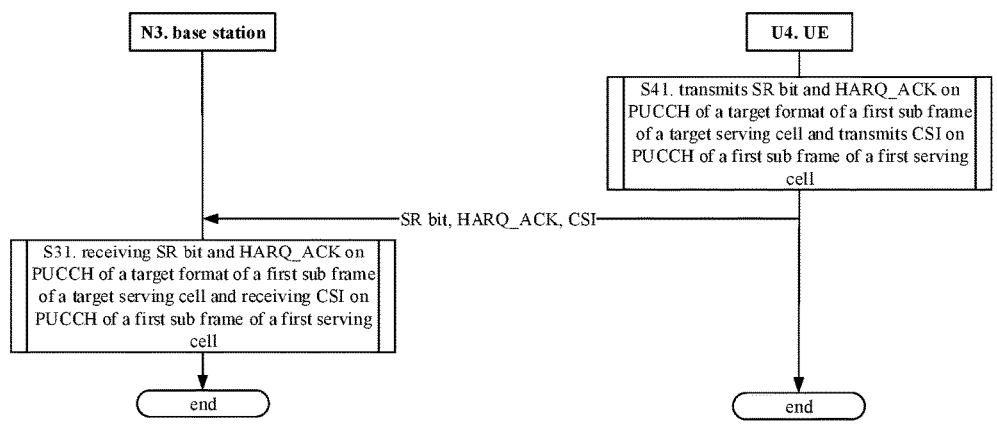
FIG. 3 is a schematic view of the SR indication information transmitted on a serving cell except a first serving cell according to one embodiment of the present disclosure.

FIG. 3 is a schematic view of the SR indication information transmitted on a serving cell except a first serving cell, as shown in FIG. 3. In FIG. 3, a base station N3 is a maintaining base station of a serving cell of a UE U4.

In step S41, the UE U4 transmits SR bit and HARQ_ACK on PUCCH of a target format of a first sub frame of a target serving cell and transmits CSI on PUCCH of a first sub frame of a first serving cell. In step S31, the base station N3 receives SR bit and HARQ_ACK on PUCCH of a target format of a first sub frame of a target serving cell and receives CSI on PUCCH of a first sub frame of a first serving cell.

In Embodiment III, the target serving cell is a serving cell other than the first serving cell. The first serving cell is a serving cell stayed by the pre-reserved SR resource configured by the base station N3 for the UE U4. The target format may simultaneously transmit SR bit and PUCCH format of HARQ_ACK.

In a first exemplary embodiment of Embodiment III, the target format is PUCCH format 3.

In a second exemplary embodiment of Embodiment III, the target format is a new PUCCH format, the new PUCCH format supports up to X HARQ_ACK bits and one SR bit, and X is a positive integer greater than 20.

In a third exemplary embodiment of Embodiment III, the base station N3 configures the target format (configured on the first serving cell or is not configured with the target format) on K−1 serving cells other than the first serving cell, and the target serving cell is a serving cell with minimum serving cell index in K−1 serving cells. The serving cell index is a non-negative integer less than 33.

Embodiment IV

Figure 4:
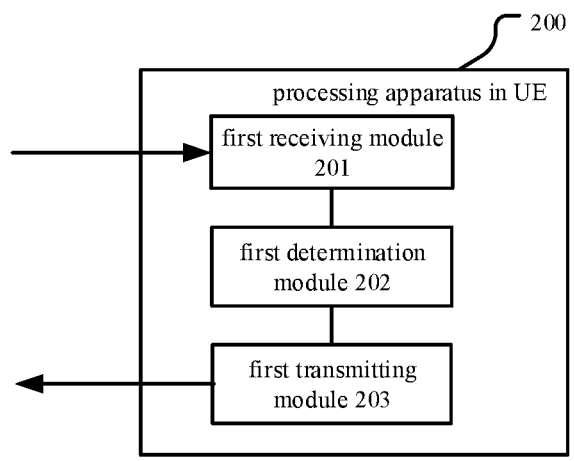
FIG. 4 is a structure diagram illustrating a processing apparatus used in a UE according to one embodiment of the present disclosure.

Embodiment IV is a structure diagram illustrating a processing apparatus used in a UE, as shown in FIG. 4. In FIG. 4, the processing apparatus 200 in the UE includes a first receiving module 201, a first determination module 202, and a first transmitting module 203.

The first receiving module 201 is used for receiving a first high layer signaling, wherein the first high layer signaling indicates a reserved SR resource on a first serving cell. The first determination module 202 is used for determining a target serving cell for transmitting SR indication information on a first sub frame, wherein the target serving cell is one of K candidate serving cells and how to determine the target serving cell is UE implementation related. The first transmitting module 203 is used for transmitting the SR indication information on the first sub frame of the target serving cell.

In Embodiment IV, the first serving cell is one of K candidate serving cells, the reserved SR resource is PUCCH resource, K is a positive integer, and the SR indication information indicates a positive SR or a negative SR. The UE is configured with PUCCH of target format on other serving cells except for the first serving cell in K candidate serving cells. The target format may simultaneously transmit SR bit and PUCCH format of HARQ_ACK.

In a first exemplary embodiment of Embodiment IV, K is 3, K candidate serving cells are separately a first serving cell, a second serving cell and a third serving cell, the UE is configured with one of PUCCH formats 2a on the first serving cell, the UE is configured with PUCCH format 3 on the second serving cell, and the UE is configured with the new PUCCH format in the present disclosure on the third serving cell. If the SR indication information is compatible with a scheduled CSI, the target serving cell is the first serving cell. Otherwise, the target serving cell is one of {the second serving cell, the third serving cell}.

Figure 7:
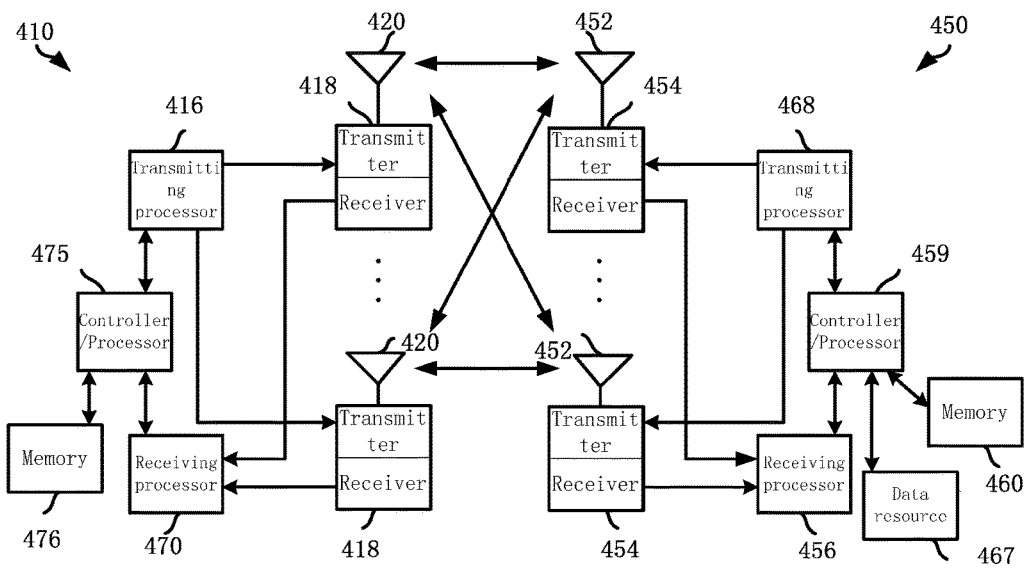
FIG. 7 is an illustration of a UE and base station.

In one embodiment, the first receiving module 201 includes at least one of a data source 467, a controller/processor 459, a receiving processor 456, a receiver 454, and an antenna 452, as show in Embodiment VII of FIG. 7.

In one embodiment, the first determination module 202 includes at least one of a transmitting processor 468, a controller/processor 459, and a memory 460, as show in Embodiment VII of FIG. 7.

In one embodiment, the first transmitting module 203 includes at least one of a transmitting processor 468, a transmitter 454, and an antenna 452, as show in Embodiment VII of FIG. 7.

Embodiment V

Figure 5:
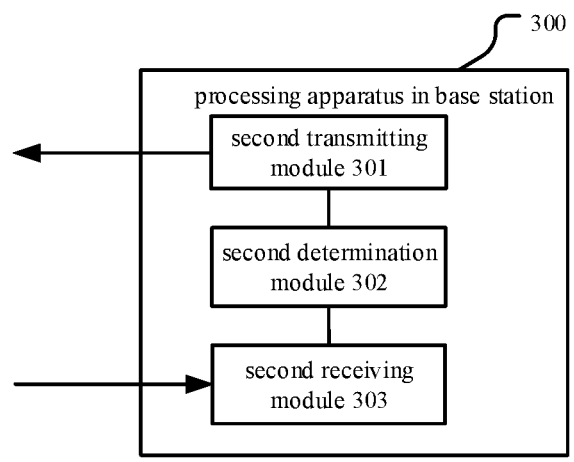
FIG. 5 is a structure diagram illustrating a processing apparatus used in a base station according to one embodiment of the present disclosure.

Embodiment V is a structure diagram illustrating a processing apparatus used in a base station, as shown in FIG. 5. In FIG. 5, the processing apparatus 300 in the base station includes a second transmitting module 301, a second determination module 302 and a second receiving module 303.

The second transmitting module 301 is used for transmitting a first high layer signaling, wherein the first high layer signaling indicates a reserved SR resource of a target UE on a first serving cell. The second determination module 302 is used for determining a target serving cell of the target UE for transmitting SR indication information on a first sub frame via blind detection, wherein the target serving cell is one of K candidate serving cells. The second receiving module 303 is used for receiving the SR indication information transmitted by the target UE on the first sub frame of the target serving cell.

In Embodiment V, the first serving cell is one of K candidate serving cells, the reserved SR resource is PUCCH resource, K is a positive integer, and the SR indication information indicates a positive SR or a negative SR. The first high layer signaling is RRC signaling.

In a first exemplary embodiment of Embodiment V, K is 3, K candidate serving cells are separately a first serving cell, a second serving cell and a third serving cell, the target UE is configured with PUCCH format 2 and PUCCH format 1b on the first serving cell, the target UE transmits PUCCH format 3 on the second serving cell, and the target UE transmits a new PUCCH format on the third serving cell. If the SR indication information is compatible with a scheduled CSI, the target serving cell is one of {the second serving cell, the third serving cell} with smaller serving cell index.

In a second exemplary embodiment of Embodiment V, the target UE transmits HARQ_ACK bit on a first sub frame of the first serving cell resulted in dropping a transmission of PUCCH format 2, the SR indication information is compatible with a scheduled CSI, and the SR indication information and the HARQ_ACK bit are indicated by the PUCCH format 1b selected by channel (i.e. if it is the positive SR, the HARQ_ACK is transmitted on the reserved SR resource, and if it is the negative SR, the HARQ_ACK is transmitted on HARQ_ACK pre-reserved for PUCCH format 1b).

In one embodiment, the second transmitting module 301 includes at least one of a controller/processor 475, a memory 476, a transmitting, a transmitter 418, and an antenna 420, as show in Embodiment VII of FIG. 7.

In one embodiment, the second determination module 302 includes at least one of a controller/processor 475, and a receiving processor 470, as show in Embodiment VII of FIG. 7

In one embodiment, the second receiving module 303 includes at least one of a receiving processor 470, a receiver 418, and an antenna 420, as show in Embodiment VII of FIG. 7.

Embodiment VI

Figure 6:
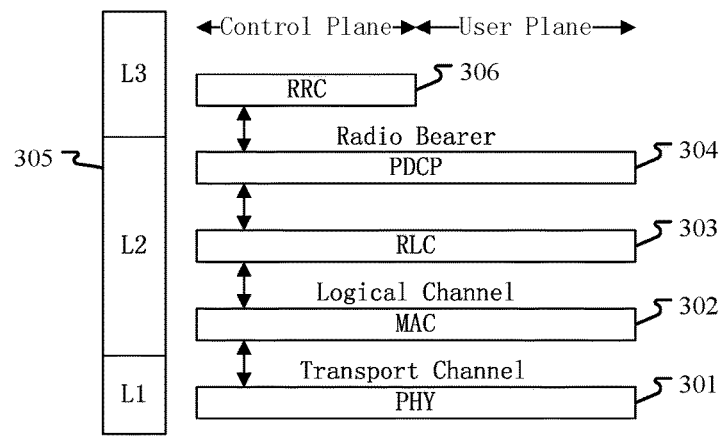
FIG. 6 is a structure diagram illustrating a radio protocol architecture of a user plane and a control plane.

Embodiment VI is a structure diagram illustrating a radio protocol architecture of a user plane and a control plane, as shown in FIG. 6.

In FIG. 6, there are three layers: a L1 (layer 1) 301, a L2 (layer 2) 305 and a L3 (layer 3) 306. The L1 301 is the lowest layer to process the physical layer signal. The L2 305 is above the L1 301, which is in charge of the link between a UE and a base station via the L1 301. In the user plane, L2 305 includes a MAC (Medium Access Control) 302 sublayer, a RLC (Radio Link Control) 303 sublayer, and a PDCP (Packet Data Convergence Protocol) 304 sublayer. All the three sublayers end at the base station of the network side. Although not described in FIG. 6, the UE may include several higher layers above the L2 305, such as network layer ending at a P-GW213 and an application layer ending at the other side of the linkage (i.e. a peer UE, a server, etc.). The PDCP 304 sublayer provides the multiplexing among variable radio bearers and logical channels. The PDCP 304 also provides a header compression for a higher layer data packet so as to reduce a radio transmission overhead. The PDCP 304 also provides security via encrypting a data packet and provides UE handover between two base stations. The RLC 303 provides segmentation and reassembling of a higher layer data packet, retransmission of a lost data packet, reordering of a lost data packet. The MAC 302 provides the multiplexing between logical channels and transport channels. The MAC 302 may allocate radio resource (i.e., resource block) for the UE and HARQ operation.

In the control plane, a radio protocol architecture of a UE is almost the same as a radio protocol architecture of a base station for L1 301 and L2 305. The control plane also includes L3 (layer 3) 306, i.e., RRC (Radio Resource Control) sublayer. The L3 306 can schedule the radio resource via a RRC signaling.

In one embodiment, the radio protocol architecture in FIG. 6 is applicable for the UE of this invention.

In one embodiment, the radio protocol architecture in FIG. 6 is applicable for the base station of this invention.

Embodiment VII

Embodiment VII is an illustration of a UE and base station, as shown in FIG. 7.

FIG. 7 describes an architecture of a UE 450 and an architecture of a base station 410 in the access network.

In downlink transmission, a packet from a higher layer is provided to a controller/processor 475. The controller/processor 475 provides a function of a layer 2. In downlink transmission, the controller/processor 475 provides header compression, encrypting, packet segmentation and reordering, multiplexing between logical channel and transport channel, and the resource allocation for the UE 450. The controller/processor 475 is in charge of HARQ operation, retransmission of the lost packet, and the signaling to the UE450. A transmitting processor 416 performs a signal processing function used for a layer 1. The signal processing function includes encoding and interleaving so as to ensure a FEC (Forward Error Correction) and a demodulation corresponding to a modulation scheme (i.e., BPSK, QPSK, M-QAM, etc.) at the UE 450 side. The encoded and modulated signals are divided into parallel streams, which are then mapping into radio resources (i.e., a subcarrier, multiple subcarriers, multiple code channels, multiple Resource Elements, etc.). The parallel streams can be used to generate spatial streams via precoding. The spatial streams can go through transmitter 418 and be sent to multiple antennas 420. Every transmitter 418 is used to transmit a corresponding RF (Radio Frequency) carrier.

At the UE 450 side, every receiver 454 receives signal via a corresponding antenna 452. Every receiver 454 recovers information modulated to RF carrier and provides the information to a receiving processor 456. The receiving processor 456 performs the signal processing function for layer 1. The receiving processor 456 performs spatial processing on the information to recover any spatial stream targeting the UE 450. If there are multiple spatial streams are targeting the UE 450, the multiple spatial streams can be assembled into a single symbol stream by the receiving processor 456. The symbol stream can be recovered and demodulated via determining the most possible transmitting symbol set by the base station 410. The symbol stream is then decoded and deinterleaved so as to recover an original data and signaling transmitted by the base station 410. The original data and signaling is then provided to a controller/processor 459. The controller/processor 459 performs a layer 2 operation. The controller/processor 459 can be connected to a memory 460 that stores programmed code and data. The memory 460 is computer readable. In downlink transmission, the controller/processor 459 provides the multiplexing between the transport channel and the logical channel, packet reassembling, decrypting, header decompression, and control signaling processing so as to recover a packet coming from the higher layer. The packet coming from the higher layer is then provided to the higher layers above layer 2, or the control signaling is provided to layer 3 for processing. The controller/processor 459 can also perform error detection on a HARQ-ACK to support the HARQ operation.

In the uplink transmission, a data source 467 provides a packet from a higher layer to the controller/processor 459. The data source 467 illustrates all the protocol layers above layer 2. Similar as the function description of the base station 410 in downlink transmission, the controller/processor 459 provides a function of a layer 2 of control plane and user plane based on a resource allocation from the base station 410. In uplink transmission, the controller/processor 459 provides header compression, encrypting, packet segmentation and reordering, and multiplexing between logical channel and transport channel. The controller/processor 459 is in charge of HARQ operation, retransmission of the lost packet, and the signaling to the base station 410. A transmitting processor 468 selects suitable encoding and modulation schemes, and can generate a spatial stream. The spatial stream generated by the transmitting processor 468 is provided to different transmitters, and then different antennas. Each transmitter 454 corresponds to a single antenna 452.

The base station 410 applies the similar manner to perform uplink reception as the UE 450 to perform the downlink reception.

Every receiver 418 receives signal via a corresponding antenna 420. Every receiver 418 recovers information modulated to RF carrier, and provide the information to a receiving processor 470. The receiving processor 470 can perform layer 1. A controller/processor 475 perform layer 2. The controller/processor 475 can be connected to a memory 476 that stores programmed code and data. The memory 476 is computer readable. In uplink transmission, the controller/processor 476 provides the multiplexing between the transport channel and the logical channel, packet reassembling, decrypting, header decompression, and control signaling processing so as to recover a packet coming from the higher layer of the UE 450. The packet coming from the higher layer may be provided to the core network. The controller/processor 475 can also perform error detection on a HARQ-ACK to support the HARQ operation.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. An enhanced CA PUCCH method in a UE, comprising the following steps:
   Step A: receiving a first high layer signaling, wherein the first high layer signaling indicates a reserved SR resource on a first serving cell;
   Step B: determining a target serving cell for transmitting SR indication information on a first sub frame, wherein the target serving cell is one of K candidate serving cells and how to determine the target serving cell is UE implementation related; and
   Step C: transmitting the SR indication information on the first sub frame of the target serving cell;
   wherein the first serving cell is one of K candidate serving cells, the reserved SR resource is a PUCCH resource, K is a positive integer, and the SR indication information indicates a positive SR or a negative SR;

wherein the UE is configured with a PUCCH of a target format on other serving cells except for the first serving cell of the K candidate serving cells; and wherein the target format simultaneously transmits SR bit and PUCCH format of HARQ_ACK.

2. The enhanced CA PUCCH method in the UE according to claim 1, wherein if the SR indication information is compatible with a scheduled CSI, the target serving cell is the first serving cell.

3. The enhanced CA PUCCH method in the UE according to claim 2, wherein if the SR indication information conflicts with the scheduled CSI, the step C further comprises the following step:
Step C2: transmitting CSI on PUCCH of the first sub frame of the first serving cell;
Step C3: transmitting HARQ_ACK on PUCCH of the first sub frame of the target serving cell;
wherein the target serving cell is a serving cell other than the first serving cell; the SR indication information and the HARQ_ACK are jointly transmitted on PUCCH of one target format, the SR indication information indicates the positive SR; the target format simultaneously transmits SR bit and PUCCH format of HARQ_ACK.

4. The enhanced CA PUCCH method in the UE according to claim 3, wherein the UE is configured with PUCCH of target format on other serving cells except for the first serving cell in K candidate serving cells; the target format simultaneously transmits SR bit and PUCCH format of HARQ_ACK.

5. The enhanced CA PUCCH method in the UE according to claim 2, wherein the UE is configured with PUCCH of target format on other serving cells except for the first serving cell in K candidate serving cells; the target format simultaneously transmits SR bit and PUCCH format of HARQ_ACK.

6. The enhanced CA PUCCH method in the UE according to claim 2, wherein if the SR indication information conflicts with the scheduled CSI, the step C further comprises the following step:
Step C2: transmitting CSI on PUCCH of the first sub frame of the first serving cell;
Step C3: transmitting HARQ_ACK on PUCCH of the first sub frame of the target serving cell;
wherein the target serving cell is a serving cell other than the first serving cell; the SR indication information and the HARQ_ACK are jointly transmitted on PUCCH of one target format, the SR indication information indicates the positive SR; the target format simultaneously transmits SR bit and PUCCH format of HARQ_ACK.

7. A user equipment, comprising:
hardware including a processing system and one or more antennas, the hardware being configured to perform operations comprising:
receiving a first high layer signaling, wherein the first high layer signaling indicates a reserved SR resource on a first serving cell;
determining a target serving cell for transmitting SR indication information on a first sub frame, wherein the target serving cell is one of K candidate serving cells and how to determine the target serving cell is UE implementation related; and
transmitting the SR indication information on the first sub frame of the target serving cell;
wherein the first serving cell is one of K candidate serving cells, the reserved SR resource is PUCCH resource, K is a positive integer, and the SR indication information indicates a positive SR or a negative SR;
wherein the user equipment is configured with a PUCCH of a target format on other serving cells except for the first serving cell of the K candidate serving cells; and wherein the target format simultaneously transmits SR bit and PUCCH format of HARQ_ACK.

8. The user equipment according to claim 7, wherein if the SR indication information is compatible with a scheduled CSI, the target serving cell is the first serving cell.

9. The user equipment according to claim 8, wherein if the SR indication information conflicts with the scheduled CSI, the operations further comprise:
transmitting CSI on PUCCH of the first sub frame of the first serving cell;
transmitting HARQ_ACK on PUCCH of the first sub frame of the target serving cell;
wherein the target serving cell is a serving cell other than the first serving cell; the SR indication information and the HARQ_ACK are jointly transmitted on PUCCH of one target format, the SR indication information indicates the positive SR; the target format simultaneously transmits SR bit and PUCCH format of HARQ_ACK.

10. The user equipment according to claim 9, wherein the UE is configured with PUCCH of target format on other serving cells except for the first serving cell in K candidate serving cells; the target format simultaneously transmits SR bit and PUCCH format of HARQ_ACK.

11. The user equipment according to claim 8, wherein the UE is configured with PUCCH of target format on other serving cells except for the first serving cell in K candidate serving cells; the target format simultaneously transmits SR bit and PUCCH format of HARQ_ACK.

12. The user equipment according to claim 7, wherein if the SR indication information conflicts with the scheduled CSI, the operations further comprise:
transmitting CSI on PUCCH of the first sub frame of the first serving cell;
transmitting HARQ_ACK on PUCCH of the first sub frame of the target serving cell;
wherein the target serving cell is a serving cell other than the first serving cell; the SR indication information and the HARQ_ACK are jointly transmitted on PUCCH of one target format, the SR indication information indicates the positive SR; the target format simultaneously transmits SR bit and PUCCH format of HARQ_ACK.

* * * * *